March 21, 1939.  A. H. RZEPPA  2,150,942
TORQUE TRANSMITTING UNIVERSAL JOINT
Filed Feb. 21, 1938   2 Sheets-Sheet 1
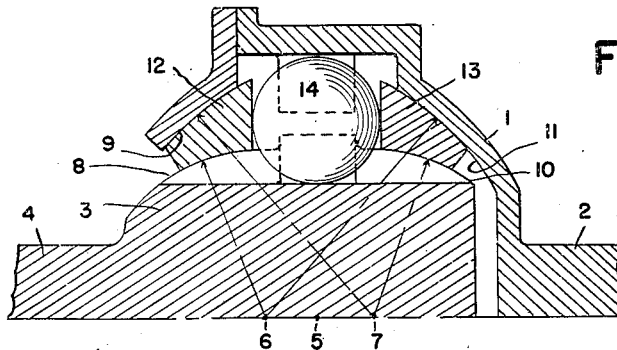
FIG.1.
FIG.2.
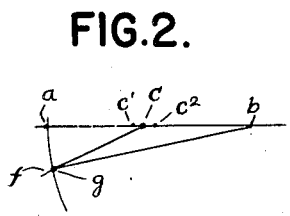
FIG.3.
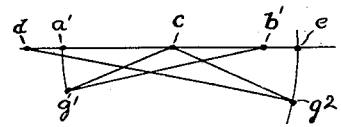
FIG.7.
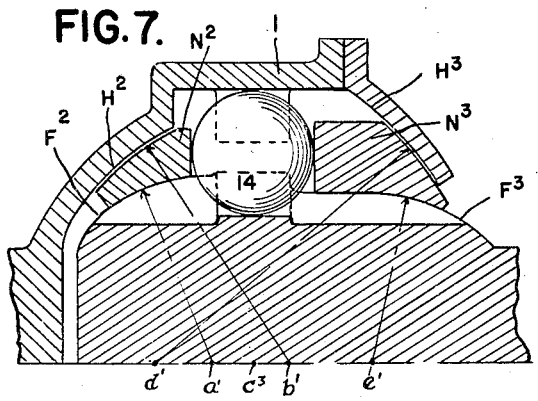
FIG.8.
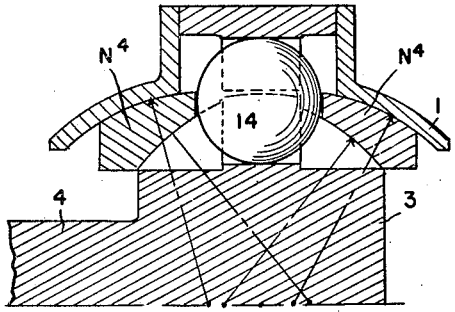
FIG.9.
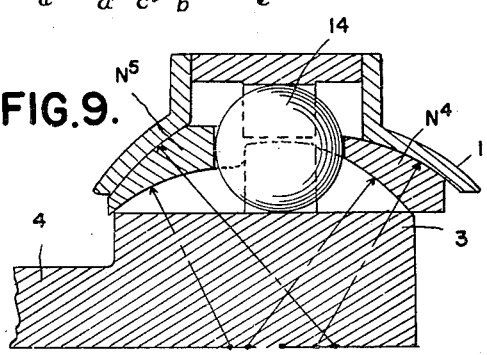
INVENTOR
ALFRED H. RZEPPA
BY
Whittemore Hulbert & Belknap
ATTORNEYS March 21, 1939.  A. H. RZEPPA  2,150,942
TORQUE TRANSMITTING UNIVERSAL JOINT
Filed Feb. 21, 1938   2 Sheets-Sheet 2
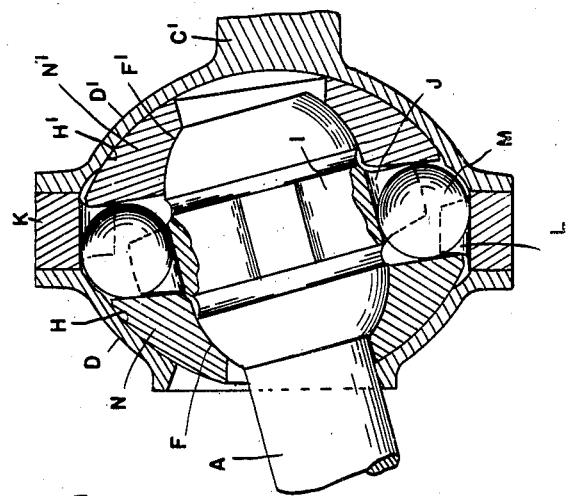
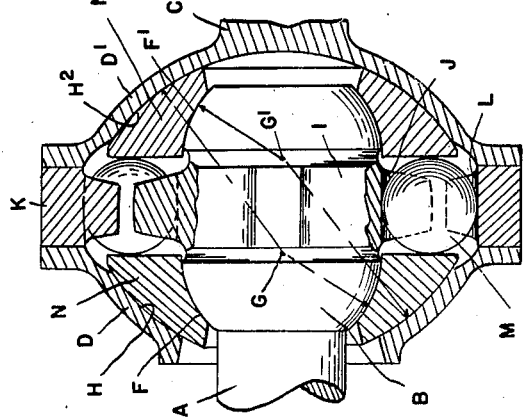
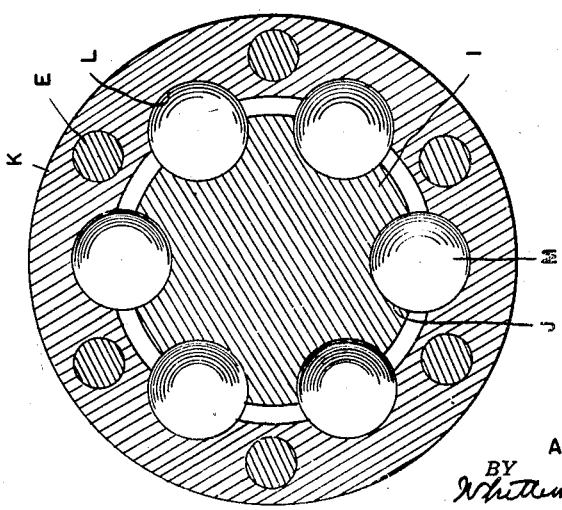
INVENTOR
ALFRED H. RZEPPA
ATTORNEYS Patented Mar. 21, 1939

2,150,942

UNITED STATES PATENT OFFICE 2,150,942

TORQUE TRANSMITTING UNIVERSAL JOINT

Alfred H. Rzeppa, Grosse Pointe, Mich.

Application February 21, 1938, Serial No. 191,745

10 Claims. (Cl. 64—21)

The invention relates to torque transmitting universal joints of that type known as constant velocity in which the speed ratio betwen the driving and the driven member remains constant in all portions of the cycle. More particularly, the invention relates to joints of this type in which the driving and driven member have a spherical engagement and with meridian grooves therein containing balls through which the torque is transmitted. The principle of operation is that for any angular movement of the axes of the drive and driven members with respect to each other, there will be exactly one-half the angular movement of the balls, or in other words, the balls will rotate in a plane which bisects the angle between the axes of the drive and the driven members. It has been found in practice that due to unavoidable inaccuracies in construction, it is difficult to always maintain the plane of the balls exactly midway between the axes, and various constructions have been devised to cure this difficulty. One such construction shown in my former Patent 2,010,899, provides, in addition to the main spherical engagement between the drive and driven members, spherical surfaces on said members concentric with centers respectively on opposite sides of the main center and equispaced therefrom. Between these surfaces is a floating member which by engagement with the cage which controls the balls, will move this member angularly one-half the angle of that between the axes of the shafts. There is however, further difficulty due to the fact that the geometry of such a construction is only correct upon the assumption that there is zero clearance between the engaging members and also on the fundamental assumption of Euclidean geometry that we are dealing with absolutely rigid forms. In practice, neither of these assumptions is correct, and consequently the relative movements of the members is not such as would appear from the geometry involved.

It is the object of the present invention, first to simplify the construction and to thereby lessen the cost of manufacture of the joint, and second to so modify the geometry employed as to, in a measure, compensate for unavoidable inaccuracies in mechanical constructions. With these objects in view, the invention consists in the construction as hereinafter set forth.

In the drawings:

Figures 1, 2 and 3 are diagrams illustrating the principle of construction of my improved torque transmitting universal joint;

Figure 4 is an axial section through the joint;

Figure 5 is a central cross section thereof;

Figure 6 is a view similar to Figure 4 showing an angular adjustment of the joint;

Figures 7, 8 and 9 are diagrams similar to Figure 1, illustrating modified constructions.

In my former Patent 2,010,899 above referred to, there is an inner male spherical member attached to one shaft, an outer female spherical member attached to the other shaft, and an intermediate cage member having parallel spherical surfaces respectively engaging said inner and outer members. The balls are carried in slots in this cage member and engage meridian grooves in the outer and inner members. Also, the cage is adjusted to its mid-position by the operation of a floating member which is intermediate spherical surfaces on said outer and inner members concentric respectively with centers on opposite sides and equispaced from the center of the first mentioned spherical surfaces. While the pilot controls the movement of the cage it does not directly control the angular movement of the shafts with respect to each other, nor can the balls be properly adjusted without the intermediate cage. With my present construction I entirely dispense with the cage and also may dispense with any direct spherical engagement between the outer and inner members concentric with the point around which the axes of these members are adjusted. This is accomplished by providing a second pilot member on the opposite ends of the main members, both pilots being so constructed that the floating members thereof directly engage the balls which are intermediate the same. Thus with these two pilots the outer and inner members will float with respect to each other and without any direct engagement concentric to the point about which they turn. This is diagrammatically represented in Figure 1, in which 1 represents one-half of the outer member attached to the shaft 2, and 3 represents one-half of the inner member attached to the shaft 4. 5 is the center around which the shafts 2 and 4 turn when in angular relation to each other. This center is not, however, concentric with any portion of the engaging surfaces between the outer and inner members which are as follows: 6 and 7 are centers on opposite sides and equispaced from the center 5, and which are the centers of spherical surfaces on the outer and inner members. The spherical surface 8 on the inner member 3 is concentric with the center 6 and on the same side of the center 5. The spherical surface 9 on the outer member 1 is concentric with the center 7 on the opposite side of the center 5.

In the same manner, the spherical surface 10 on the member 3 is concentric with the center 7 and the spherical surface 11 on the member 1 is concentric with the center 6. Between the spherical surfaces 8, 9 and 10, 11 are annular floating members 12 and 13, and these bear upon opposite sides of the balls 14 which are in meridian grooves in the outer and inner members and transmit the torque therebetween. These outer and inner members need not, however, come in direct engagement with each other in the portions containing the meridian grooves for such engagement is not necessary to cause the joint to swing about the center 5. Such swinging is effected by the combined action of the pilots 12 and 13, so that these members, in addition to their function of moving the balls, hold the outer and inner members to a relative movement about the center 5.

A simplified diagram, Figure 2, will explain the geometry involved. In this $a$ and $b$ are two centers (corresponding to the centers 6 and 7) and $c$ is the midpoint between these centers. If a line $cf$ is drawn from this center $c$ at any angle to the lines $a$ and $b$, and an arc drawn from the center $b$ with a radius $ab$ so as to intersect the line $cf$ at point $g$, and a line drawn from the point $g$ to the point $b$, then the angle $acg$ is twice the magnitude of the angle $abg$. The construction previously described in Figure 1, will produce this effect by the floating action of the members 12 and 13 between the surfaces 8, 9, 10 and 11, holding the point 5 midway between the points 6 and 7. This, however, is on the assumption that the clearance between the engaging members is zero, which is never the case in practice. Thus, to the extent that there is clearance or any irregularity in form of these members, the center 5 will not be held midway between the points 6 and 7, or as shown in the diagram, Figure 1, the point $c$ will not be midway between the points $a$ and $b$, but may be a short distance on either side of such point, as indicated by $c'$, $c^2$. This also results in an angular movement of the pilots which instead of being exactly one-half of the relative angular movement of the shafts is slightly less than such amount.

To compensate to some degree for the inaccuracies just referred to, the construction in Figure 1 may be modified as diagrammatically illustrated in Figure 3. In this, in place of the points $a$, $b$ equispaced from the point $c$, there are the points $a'$, $b'$ on opposite sides of the point $c$, but at slightly different distances therefrom. These points are the centers for the spherical zones on the members 1 and 3, Figure 1, which are on one side of the central point 5. If the line $g'c$ is at any selected angle to the line $a'b'$ then the angle $a'b'g'$ instead of being exactly one-half the angle $a'cg'$, will be somewhat more than one-half. In the same manner, two other points $de$ may be taken on opposite sides of the point $c$ and non-coincident with the points $a'b'$ with the ratio of lengths $ec$ to $dc$ equal to the ratio of lengths $a'c$ to $b'c$. Then if the line $g^2c$ be drawn so that the angle $ecg^2$ is equal to the angle $a'cg'$, then the angle $edg^2$ will be more than one-half the angle $ecg^2$ and will be equal to the angle $a'b'g'$. With this modification and with the construction shown in Figure 1, each of the pilots would with zero clearances be moved more than one-half the angular movement of the shafts, but with unavoidable clearances, this extra movement will be absorbed, so that the pilots will move exactly one-half the angular movement of the shafts. This effect would be produced either with one or two pilots, only assuming that the angular movement of the shafts is about the point $c$.

In detail, one construction of my improved universal joint is illustrated in Figures 4, 5 and 6, in which A is a shaft member having mounted thereon or formed integral therewith the inner male member B of the joint, and C is the other shaft member carrying the outer female member of the joint. The latter is preferably formed in half sections D and D', which are secured to each other by bolts or other fastening devices E. The member B has spherical surfaces F and F' which in the co-axial arrangement of the shafts A and C are concentric with points G and G' on opposite sides of the mid-plane between the members D and D'. These same points G and G' are the centers of spherical surfaces H and H' respectively on the members D and D', the surface H being concentric with the point G' and the surface H' being concentric with the point G. The member B has a central portion I in which are formed a series of grooves J parallel to the axis of the shaft A and distributed around the same. The members D and D' have arranged intermediate the same a member K which also is provided with a series of grooves L parallel to the axis of the shaft C and distributed around the same. In these grooves J and L are balls M which function to transmit torque between the members I and K. While the latter members might be made to engage each other by spherical surfaces concentric with a point midway between the points G and G', such construction is not necessary and preferably is omitted. In place, the members I and K are sufficiently spaced from each other to permit of the required relative movement thereof and this movement is determined by floating members N and N', as well as by the balls M in the grooves J and L. These members N and N' have outer and inner spherical surfaces F, H and F', H' and for the reasons stated above the angular movement of these floating or pilot members N and N', will be approximately one-half the angular movement of the axes of the shafts A and C with respect to each other. Figure 6 shows the construction with the shaft A at an angle to the shaft C and as indicated in this figure, the angular movement of the plane of the balls is one-half the angular movement between the axes of the shafts, so that this plane bisects such angle.

As thus far described, the joint shown in Figures 4 to 6 would be inaccurate in its functioning to a degree corresponding to the cumulative clearance between the several members. This may be corrected, as described in connection with the diagram, Figure 3, by unequally spacing the centers of the spherical zones on the outer and inner members from the center of angular movement of the shafts. However, as the necessary displacement is not very great, it is not illustrated in Figures 4 to 6, but is illustrated in the diagram, Figure 7. This is similar in arrangement of the centers to that shown in Figure 3, and it will be noted that the center of the spherical zone $F^2$ is the point $a'$ to the left of the point $c^3$. The center of the spherical zone $H^2$ is the point $b'$ to the right of the point $c^3$. The center of the zone $F^3$ is the point $e'$ to the right of $c^3$ and the center of the zone $H^3$ is the point $d'$ to the left of the point $c^3$. The length $a'c^3$ is greater than the length $b'c^3$, and the length $e'c^3$ is greater than the length $d'c^3$, the proportion being $a'c^3$ to $b'c^3$ equals $e'c^3$ to $d'c^3$. This arrangement with zero clearances between the parts would make an over angular movement of the pilots $N^2$ and $N^3$, but as indicated there is clearance between these pilots and the spherical zones $H^2$ and $H^3$. Consequently, the angular movement of the pilots is such as to shift the plane of the balls so as to exactly bisect the angle between the axes of the shafts.

The structure may be variously modified according to the uses for which it is designed, all modifications operating upon the same principle. Thus as shown in Figure 7, the distance between the points $a'b'$ is considerably less than the distance between the points $d'e'$. This makes the spherical zones and the intermediate pilot to the left of the point $c^3$ of quite different shape from that at the right of said point. With the modification shown in Figure 8, the spherical surface in the outer member for engaging the pilot is concentric to a point on the same side of the center of oscillation of the joint, and the spherical surface of the inner member for engaging the same pilot is concentric with the point on the opposite side of the center of oscillation. The pilot $N^4$ between these surfaces is thus of a form tapering in axial section toward the end engaging balls, whereas with the constructions shown in Figures 1 to 7, the pilots are oppositely tapered. In Figure 9 the pilot $N^4$ on the right hand side is similar to Figure 8, while the pilot $N^5$ on the left hand side is similar to Figure 7. All of these modifications will function in substantially the same way, but the differences in form may be desirable for different uses.

What I claim as my invention is:

1. In a universal joint, outer and inner members having opposed pairs of spherical zones the zones of each pair being spaced from and non-concentric with each other with the centers thereof axially spaced, and a pair of intermediate floating members having complementary spherical surfaces and being in thrust engagement with each other whereby relative angular movement of said outer and inner members is determined by said floating members to be substantially about a point midway between said spaced centers.

2. In a universal joint, outer and inner rotary members having opposed pairs of spherical zones the zones of each pair being spaced from and non-concentric with each other with the centers thereof axially spaced, said members also having meridian grooves therein, balls in said grooves for transmitting torque from one of said members to the other, and a pair of floating members on opposite sides of and in contact with said balls having spherical surfaces complementary to the opposed spherical zones whereby relative angular movement of said outer and inner members is determined by said floating members to be substantially about a point midway between said axially spaced points, and said balls are piloted to a plane substantially bisecting the angle between said members.

3. In a universal joint, outer and inner rotary members having their axes angularly movable about a fixed point, said members having registering meridian grooves therein and also having opposed spherical zones spaced from each other and respectively concentric with points axially spaced on opposite sides of said fixed point, the point on one side of said fixed point being a slightly greater distance therefrom than the point on the opposite side thereof, balls in said grooves for transmitting torque from one member to the other, and a pilot member for said balls having a portion intermediate said zones with corresponding spherical surfaces, the difference in the spacing of the center points thereof from said fixed point to some extent compensating for inaccuracies in form and clearances between the spherical members to more accurately pilot said balls into a plane bisecting the angle between said members.

4. In a universal joint, outer and inner rotary members having their axes angularly movable about a fixed point, said members having registering meridian grooves therein and also having two pairs of opposed spherical zones on opposite sides of said fixed point, the zones of each pair being spaced from each other and respectively concentric with points axially spaced on opposite sides of said fixed point, the center points for the opposite zones of each pair being differentially spaced from said fixed point, the ratio being the same in each pair but with the greater spacing of one pair being on the opposite side of said fixed point from the greater spacing of the other pair, balls in said grooves for transmitting torque from one member to the other, and a pair of annular floating members on opposite sides of and in contact with said balls having spherical surfaces complementary to the opposed spherical zones, whereby relative angular movement of said outer and inner members is determined by said floating members to be substantially about said fixed point and the differential spacing of the centers of said zones from said fixed point increasing the angular movement of said pilots to compensate for inaccuracies in form and clearances between the spherical members and to more accurately pilot said balls into a plane bisecting the angle between the axes of said members.

5. In a universal joint, outer and inner rotary members having their axes angularly movable about a fixed point, said members having registering meridian grooves therein and also having on one side of said fixed point opposed spherical zones spaced from each other and respectively concentric with points axially spaced on opposite sides of said fixed point, the center point for the zone of the outer member being on the same side of said fixed point and the center point for the zone of the inner member being on the opposite side of said fixed point, balls in said grooves for transmitting torque from one member to the other and an annular pilot member for said balls having a portion intermediate said zones with corresponding spherical surfaces, said pilot being in axial cross section tapering from its outer end to the end adjacent said balls.

6. In a universal joint, outer and inner rotary members having their axes angularly movable about a fixed point, said members having registering meridian grooves therein and also having on opposite sides of said fixed point pairs of opposed spherical zones spaced from each other and respectively concentric with points axially spaced on opposite sides of said fixed point, the center point for the zone of the outer member of each pair being on the same side of said fixed point and the center point of the zone of the inner member for each pair being on the opposite side of said fixed point, balls in said grooves for transmitting torque from one member to the other, and annular pilot members on opposite sides of said balls and in contact therewith, each pilot having a portion intermediate said zones with corresponding spherical surfaces and being in axial cross section tapering from its outer end to the end in contact with said balls.

7. In a universal joint, outer and inner rotary members having their axes angularly movable about a fixed point, said members having registering meridian grooves therein and also having on opposite sides of said fixed point pairs of opposed spherical zones spaced from each other and respectively concentric with points axially spaced on opposite sides of said fixed point, the center point for the zone of the outer member of one pair being on the same side of said fixed point the center point of the zone of the inner member of the same pair being on the opposite side of said fixed point and the center points for the zones of the other pair being in reverse relation to said fixed point, balls in said grooves for transmitting torque from one member to the other, and annular pilot members on opposite sides of said balls and in contact therewith, each pilot having a portion intermediate said zones with corresponding spherical surfaces and one of said pilots being in axial cross section tapering from its outer end to the end in contact with said balls and the other pilot tapering from its end in contact with the balls to its outer end.

8. In a universal joint, outer and inner rotary members having their axes angularly movable about a fixed point, said members having registering meridian grooves therein and also having two pairs of opposed spherical zones on opposite sides of said fixed point, the zones of each pair being spaced from each other and respectively concentric with points axially spaced and upon opposite sides of said fixed point, the center points for the zones of one pair being spaced a greater distance from said fixed point than the center points of the other pair.

9. In a universal joint, outer and inner rotary members having registering axially extending ball race grooves therein and opposed pairs of spherical zones at opposite ends of said grooves, balls in said grooves for transmitting torque from one of said members to the other, and floating pilot members arranged intermediate the opposed zones and having complementary spherical surfaces, said pilot members contacting with said balls, and the centers of the spherical zones of at least one pair being non-coincident, whereby the plane of rotation of the balls substantially bisects the angle between the axes of said outer and inner members in each position of relative adjustment thereof.

10. In a universal joint, outer and inner rotary members having registering axially extending ball race grooves therein and opposed pairs of spherical zones at opposite ends of said grooves, the centers of the corresponding zones of the respective pairs being non-coincident and the centers of the opposed zones of at least one pair being also non-coincident, balls in said grooves for transmitting torque from one of said members to the other, and a pair of floating members respectively between the opposed zones of each pair and having complementary spherical surfaces, said floating members being in contact with said balls and functioning to center the joint and to pilot the balls into a plane always substantially bisecting the angle between the axes of said outer and inner members.

ALFRED H. RZEPPA.